April 8, 1952      B. F. SPENCER      2,591,738
CATHODE-RAY TUBE VOLTAGE MEASURING DEVICE
Filed July 22, 1949      2 SHEETS—SHEET 1
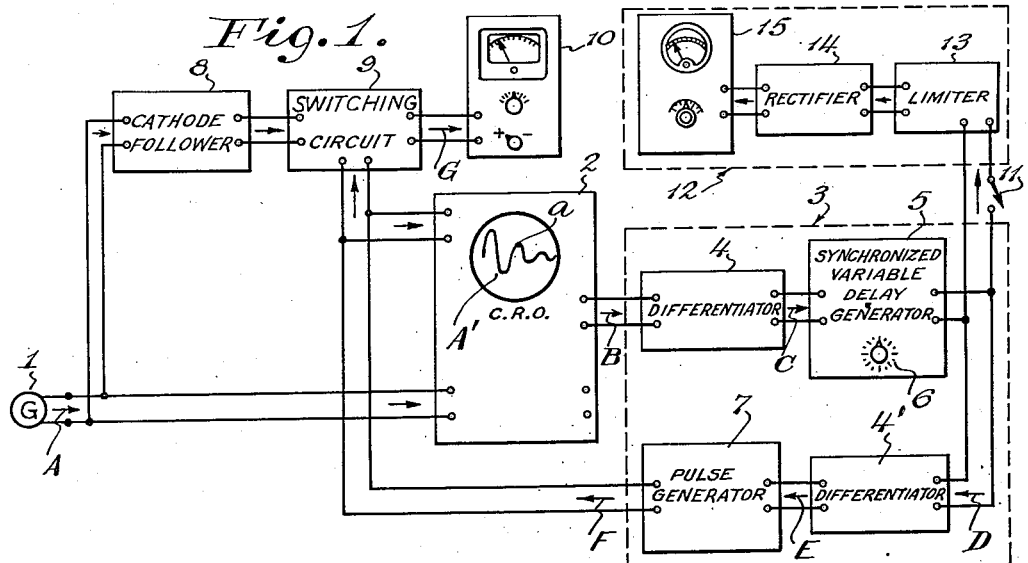
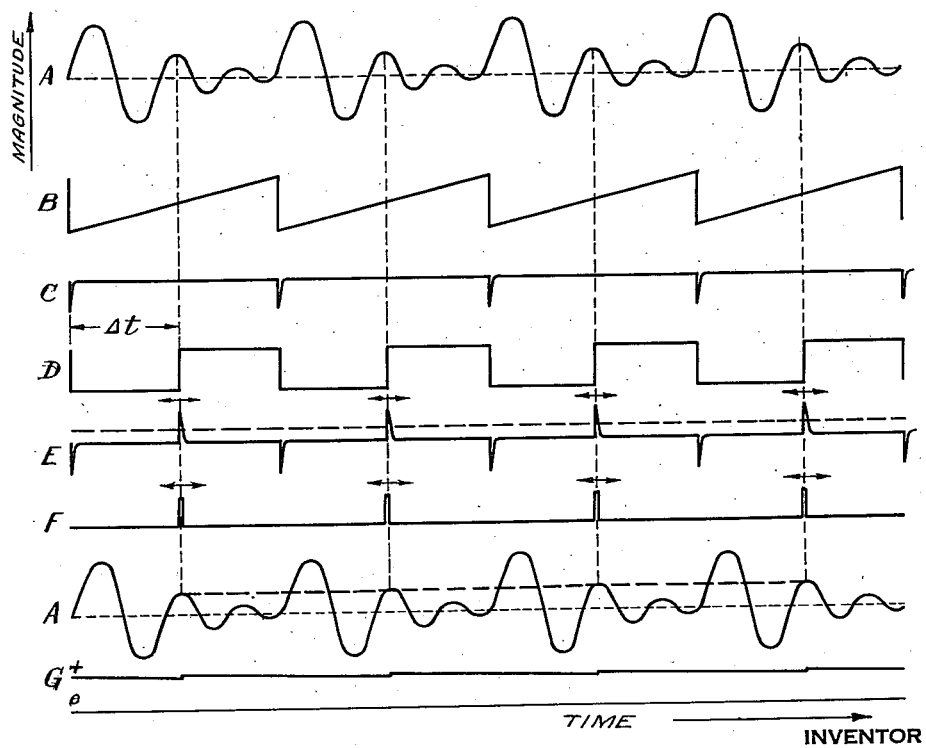
INVENTOR
BENJAMIN F. SPENCER
BY
*Paul B. Hunter*
ATTORNEY April 8, 1952 B. F. SPENCER 2,591,738
CATHODE-RAY TUBE VOLTAGE MEASURING DEVICE
Filed July 22, 1949 2 SHEETS—SHEET 2
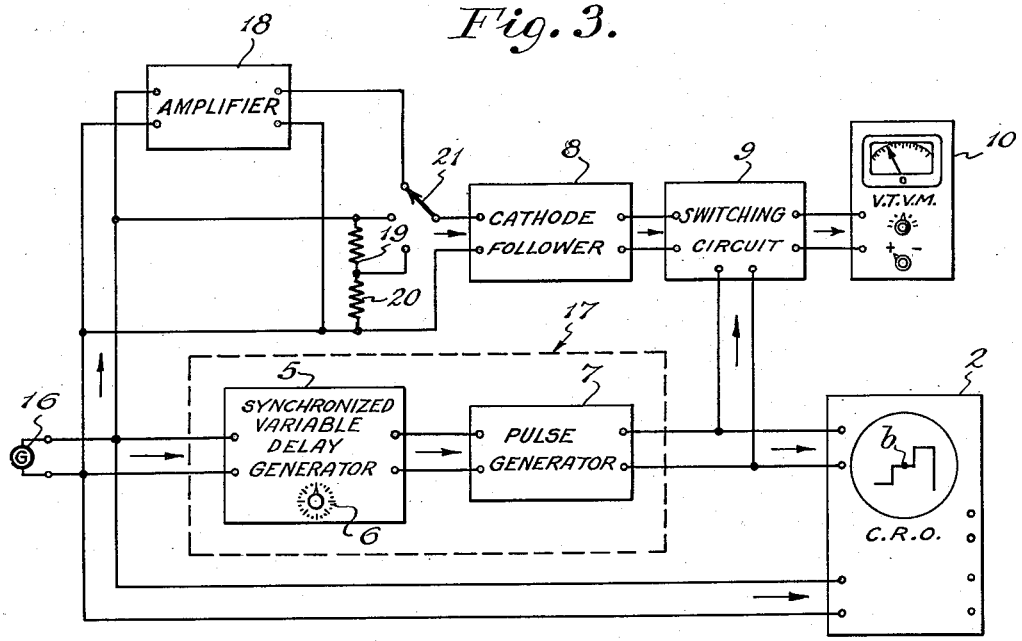
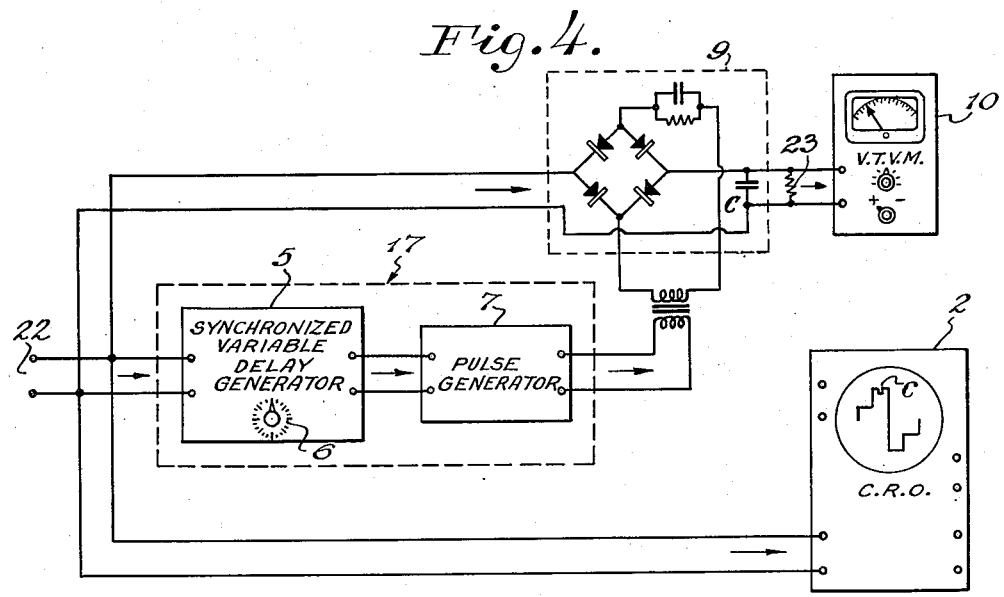
INVENTOR
BENJAMIN F. SPENCER
BY
ATTORNEY Patented Apr. 8, 1952

2,591,738

UNITED STATES PATENT OFFICE 2,591,738

CATHODE-RAY TUBE VOLTAGE MEASURING DEVICE

Benjamin F. Spencer, Garden City, N. Y., assignor to The Sperry Corporation, a corporation of Delaware Application July 22, 1949, Serial No. 106,182

15 Claims. (Cl. 171—95)

This invention relates to voltage measuring devices and in particular to a device for measuring the instantaneous intensity of an alternating voltage at a selected point on a displayed waveform of the voltage.

The design and study of precision electronic circuits requires not only an accurate knowledge of the components and functions of the circuits, but also a knowledge of the characteristics of the voltages and currents within the circuit. To determine these characteristics, it is necessary to accurately observe and measure the coordinates of these voltages and currents. The cathode-ray oscilloscope and the vacuum tube voltmeter have become standard test instruments for this type of investigation.

In observing the waveform of a voltage or current on an oscilloscope, it is often necessary to measure the magnitude or intensity of certain portions of the wave. It is important that the measurements be made as quickly as possible and with a minimum of error. A number of techniques are known for performing this type of measurement, a few of which will be briefly summarized.

If the voltage or current wave is of sufficient magnitude to be applied directly to the deflection plates of a cathode-ray oscilloscope, the displayed waveform on the face of the tube can be examined and the intensity of a selected point on the waveform can be determined by measuring the amount of deflection and multiplying by the deflection sensitivity of the tube. Also, a simple scale can be calibrated in units of intensity of deflection and affixed to the face of the tube such that the intensity of the selected points on the displayed wave can be read directly from the scale. This is known as the direct method.

A somewhat more convenient arrangement for measuring the intensity of a voltage known as the subtraction method provides an adjustable control for varying the "centering" voltage to the deflection plates and a voltmeter for measuring the change in the centering voltage necessary to return the selected point on the waveform to the base line. The base line is the position of the cathode-ray trace in the absence of an applied voltage. This type of voltage measurement is widely used in synchroscopes.

Another simple arrangement known as amplitude selection employs a biased diode clipper tube. The voltage wave to be measured is applied to the oscilloscope through the diode tube. The bias on the diode is adjusted to display the peak of the voltage wave. A measure of the direct bias voltage by a simple voltmeter is a measure of the intensity of the point on the waveform that disappears from the display. In using this arrangement with thermionic diodes, a large voltage wave is required if good accuracy is needed. To measure the intensity of a negative wave, the connection of the diode tube must be reversed compared to its connection when used in measuring a positive wave.

A popular arrangement of voltage intensity measurement is that of comparison or substitution. In this method, the point on the waveform of the voltage to be measured is compared in magnitude to a second wave of known adjustable peak value. The point of the waveform is first marked or scaled on the face of the cathode-ray tube. The second wave is then substituted for the voltage wave, and its known adjustable peak value is adjusted to be equal in magnitude to the original wave.

While these known arrangements are useful in the study of waveforms, they possess certain disadvantages and limitations some of which are listed below.

1. Accuracy of measurement is adversely affected by nonlinearities in the deflection of the oscilloscope, smallness of the face of the cathode-ray tube, and variations in width of the trace of the displayed waveform.

2. Accuracy of measurement is adversely affected by flunctuations in the amplification of the vertical deflection amplifier of the oscilloscope, and fluctuation of the displayed waveform due to line voltage fluctuations.

3. Accuracy of measurement is proportional to the magnitude of the voltage to be measured and to the amount of gain of the vertical deflection amplifier of the oscilloscope.

4. Measurements are inconvenient to make due to the scale obscuring the displayed waveform, the necessity of removing the displayed waveform from the oscilloscope when comparing to a known voltage, and the necessity of displaying only a part of the waveform in the implitude selection arrangement.

In accordance with this invention there is introduced an improved voltage measuring device for the measurement of the instantaneous intensity of a voltage wave whose waveform is displayed on an oscilloscope in which a selected point on the displayed waveform is marked simultaneously with the instantaneous measurement by a switching circuit of the intensity of the voltage wave.

An important object of the invention is to provide a simplified and improved voltage measuring device for the study of waveforms.

Another object is to provide a measuring device for the simultaneous observation and measurement of waveforms.

A further object is to provide a voltage measuring device especially adapted to be used with existing instrument readily available.

Still another object is to provide a device for measuring the coordinates of a voltage whose waveform is displayed on an oscilloscope.

The above objects and general description of the present invention will be more fully understood and further objects and advantages will become apparent from a study of the following detailed description in connection with the drawings.

Figure 1 shows a block diagram illustrating one important embodiment of the invention.

Figure 2 illustrates the waveforms of the voltages associated with Figure 1.

Figure 3 shows a block diagram illustrating another important embodiment of the invention.

Figure 4 shows a block diagram of still another arrangement of the invention.

Referring to the block diagram of Fig. 1, a voltage source generator 1 is coupled to the input terminals of the vertical deflection amplifier of cathode-ray oscilloscope 2. By proper adjustment of the cathode-ray oscilloscope, the waveform of the voltage from generator 1 may be displayed on the face of the cathode-ray tube. The sweep voltage of the cathode-ray oscilloscope is coupled to the input terminals of the synchronized variable delay pulse generator 3. This generator 3 comprises simple resistor-capacitor differentiators 4, 4', a synchronized variable delay generator 5 with an adjustable delay control knob 6, and a pulse generator 7. The synchronized variable delay generator 5 may be for example a monostable or one-shot delay multivibrator as known in the art with a potentiometer control to vary the mark-space ratio of the generated rectangular output voltage. The pulse generator 7 may be for example a blocking oscillator or other suitable pulse generator many of which are known in the art.

Voltage source generator 1 is also coupled to the input terminals of cathode follower 8. The output terminals of the cathode follower are coupled to the input terminals of the switching circuit 9. This switching circuit is known by many names in the art such as sampling circuit, pulse coincidence circuit, phase detector, gating circuit, clamping circuit, and interval selector circuit in addition to the above name. One such switching or sampling circuit particularly adapted to this invention is shown in U. S. Patent 2,250,284 to K. R. Wendt and also in the January 1943 issue of the Proceedings of the I. R. E., in an article entitled "Automatic Frequency and Phase Control of Synchronization in Television Receivers." The output terminals of switching circuit 9 are directly coupled to the terminals of D. C. vacuum tube voltmeter 10. The switching circuit 9 is energized by the sharp pulses coupled from the output terminals of pulse generator 7. These pulses from pulse generator 7 are also coupled to the Z-axis terminals of cathode-ray oscilloscope 2.

An additional feature of the invention is the time delay measuring circuit 12. This circuit is coupled through single-pole single-throw switch 11 to the output terminals of synchronized variable delay generator 5. The time delay measuring circuit comprises a limiter 13 whose input terminals are coupled to switch 11, a rectifier 14 coupled to the output terminals of the limiter, and a D. C. voltmeter 15 coupled to the output terminals of the rectifier.

The operation of the invention of Fig. 1 is best understood by reference to the associated waveforms of Fig. 2. Voltage source generator 1 produces a periodic alternating voltage of any suitable waveform such, for example, as waveform A, one period of which is displayed on the face of the cathode-ray tube as waveform A'. To produce the displayed waveform A', the sweep voltage generator within the oscilloscope must produce a synchronized sawtooth voltage shown as waveform B. A differentiated version of the sweep voltage from 4 shown as waveform C triggers the synchronized variable delay generator 5 to produce at its output terminals a rectangular voltage of waveform D. The amount of time delay $\Delta t$ produced by delay generator 5 is selected by control knob 6. This time delay $\Delta t$ is the time interval from the "negative-going" edge of waveform D to the "positive going" edge of waveform D. A differentiated version of the rectangular voltage of waveform D from 4' produces the pulse voltage waveform E. The positive trigger pulses of waveform E trigger pulse generator 7 to produce the energizing pulses of waveform F. The time position of these pulses of waveform F with respect to the pulses of waveform C is determined by control knob 6. The pulses of waveform F which are applied to the Z-axis of oscilloscope 2 are made to mark the displayed waveform on the face of the cathode-ray tube. One type of mark that can be placed upon the displayed waveform, for example, is an intensified spot $a$, as shown in Fig. 1. Any selected point on the displayed waveform can be intensified by setting the control knob 6 such that the delayed pulses of waveform F occur at times delayed from the start of the cathode-ray trace by the amount corresponding to the time position at which the selected point on the displayed waveform is to be marked. If the pulses of waveform E are of suitable duration and of sufficient peak value, they may be applied directly to the switching circuit 9 and to the Z-axis of the oscilloscope. The negative pulses of this waveform may then be used to blank the return trace of the displayed waveform.

The input terminals of the switching circuit 9 receive the periodic alternating voltage from generator 1 through cathode follower 8. The cathode follower serves to isolate the switching circuit from the generator, and it should be designed to have a voltage gain as near unity as is possible. The operation of the switching circuit 9 is such that the voltage across its input terminals is transferred to its output terminals for the duration of the energizing pulses applied to the switching circuit. Thus, the switching circuit can be described as periodically sampling the voltage across its input terminals coincident with energizing the circuit with sharp pulses. Likewise, the switching circuit 9 can be described as a circuit which connects its output terminals in parallel with its input terminals upon the arrival and for the duration of the sharp energizing or switching pulses from generator 7. The peak amplitude of the energizing pulses should always exceed the magnitude of the periodic alternating voltage at the point that the measurement is made and preferably, the peak amplitude of the pulses should be several times the magnitude of the alternating voltage wave. The energizing pulses should be of very short duration and should be shorter in duration than any particular voltage variation on the alternating voltage at the selected point that is to be measured.

An integral part of the switching circuit is a condenser C coupled across its output terminals. This condenser is periodically charged until the voltage across its terminals is the same as the voltage at the input terminals of the switching circuit at the instants of the energizing or swiching pulses. Thus, a direct voltage exists across this condenser which is equal to the magnitude of the voltage from generator 1 at the instants of time that the selected point on the displayed waveform is intensified. D. C. vacuum tube voltmeter 10 measures and indicates the direct voltage across the condenser. This direct voltage is illustrated as waveform G in Fig. 2 and can be seen to equal the magnitude of the voltage in waveform A at the occurrence of the pulses of waveform F.

The sampling or switching circuit 9 should have several desirable characteristics. It should have very little internal voltage drop between its input and output terminals during the very short interval of time that it is energized, and it should have a very large internal impedance between these terminals in the absence of energizing pulses. It should not produce an output voltage during the energizing pulse moment if no voltage exists across its input terminals. The magnitude of the direct output voltage should be independent of variations in the peak value of the energizing pulses. The sampling or switching circuit should be linear over a very wide frequency range of the alternating voltage to be measured. The four diode switching circuit of the above cited references fulfills these requirements.

The measuring device is largely independent of the frequency of the alternating voltage. The condenser in the switching circuit has such a value as to hold its charge for relatively long times. The direct voltage across the condenser is substantially equal to the alternating voltage from the source at the instants of the energizing pulses.

The apparatus is not limited to the measurement of the peak magnitude of a particular periodic alternating voltage as the example appears to illustrate but is capable of measuring the magnitude at any selected point. This is true whether or not the alternating voltage is instantaneously positive or negative at the instants of the energizing pulses. If the instantaneous voltage is negative at the instants of the energizing pulses, a negative voltage will appear across the output condenser and the D. C. vacuum tube voltmeter 10 will measure the magnitude of the negative voltage by the proper setting of its polarity switch.

As the selected point on the displayed waveform is marked, it is not necessary to calibrate the variable delay control knob 6 nor is it necessary to measure the delay time interval. The direct voltage as measured is the instantaneous magnitude of the alternating voltage at the selected point.

Upon closing switch 11 the time delay measuring circuit 12 is coupled to the output terminals of synchronized variable delay generator 5. Limiter 13 limits the amplitude of the rectangular voltage of waveform D from delay generator 5 to some arbitrary fixed level. Rectifier 14 produces a direct output voltage which is directly proportional to the average value of the limited rectangular wave for the time interval $\Delta t$. Since the amplitude of the rectangular wave into the rectifier is limited, its average value is directly proportional to the time interval $\Delta t$. Thus, D. C. voltmeter 15 will produce a deflection directly proportional to the time delay interval $\Delta t$. By simple calibration of this voltmeter, its scale can be made to indicate the time delay interval $\Delta t$ directly in microseconds.

Summarizing the operation of Fig. 1, a voltage wave from generator 1 is first displayed on the face of the cathode-ray tube by proper adjustment of the frequency and synchronization of the sweep voltage generator within the oscilloscope. By means of control knob 6, a selected point on the displayed waveform is periodically marked. Simultaneously, with the marking, the switching circuit is energized and a direct output voltage is obtained equal to the instantaneous intensity of the voltage wave from generator 1 at the instants of time that the displayed waveform is marked. The magnitude of this direct voltage is indicated on the vacuum tube voltmeter. Any point on the displayed waveform can be selected by adjustment of control knob 6 and the magnitude of the instantaneous voltage from generator 1 at the instants of marking can be read from voltmeter 10.

A paramount improvement in the convenience and rapidity of measurement is afforded with this measuring device. The accuracy of measurement does not depend upon the amount of gain in the vertical deflection amplifier of the oscilloscope. The voltage wave to be measured is displayed in its entirety at the same time the measurement is being made. The accuracy of measurement is independent of fluctuations of the displayed waveform due to varying line voltage or changes in voltage gain within the oscilloscope. The accuracy of measurement is also independent of any nonlinearities in deflection of the cathode-ray tube, or the size of the face of the cathode-ray tube, or the width of the trace of the displayed waveform.

If it is desired to measure the time interval $\Delta t$, the time from the start of the displayed waveform until the selected point is marked, the time delay measuring circuit is connected by closing switch 11 as previously described. Thus, the coordinates of a point on the displayed waveform are easily obtained.

Referring to Fig. 3, voltage generator 16 is coupled to the input terminals of the vertical deflection amplifier of cathode-ray oscilloscope 2. The waveform of the voltage from the voltage generator is displayed on the face of the cathode-ray tube. The synchronized variable delay pulse generator 17 comprises synchronized variable delay generator 5 with delay control knob 6 and pulse generator 7. The input terminals of the variable delay generator 5 are coupled to generator 16. Control knob 6 varies the delay of the output trigger pulses from the variable delay generator with respect to the point at which the variable delay generator synchronizes with the voltage wave from generator 1. The output pulses from pulse generator 7 are applied to the Z-axis terminals of cathode-ray oscilloscope 2. The displayed waveform on the face of the cathode-ray tube is intensified or marked by these output pulses at the point $b$.

The input terminals of amplifier 18 and the voltage divider comprising resistors 19 and 20 are connected in parallel and to generator 16. Amplifier 18 provides a predetermined fixed voltage gain of some suitable value, for example, a gain of 10. The voltage divider provides a predetermined dividing ratio of some suitable value, for example, a dividing ratio of 1/10. Thus, three-position selector switch 21 can select any one of three suitable voltage levels to be applied to switching circuit 9 through cathode follower 8.

The cathode follower 8 serves to isolate switching circuit 9 from generator 16. The output pulses from pulse generator 7 are coupled to switching circuit 9, energizing this circuit as previously described to provide a direct output voltage equal to the instantaneous intensity of the voltage at the input terminal of the switching circuit at the occurrence of the energizing pulses. Voltmeter 10 coupled to the output terminals of the switching circuit indicates the magnitude of this direct output voltage.

With this embodiment of the invention, a much larger range in level of the voltage wave may be measured. Voltage waves of smaller amplitude than normally measured by the switching circuit can be easily and accurately measured. Greater flexibility exists with this arrangement of the invention in that the synchronized variable delay pulse generator 17 may be synchronized to various sub-multiples of the repetition frequency of the voltage wave. If desired, the repetition frequency of the synchronized variable delay pulse generator 17 may be adjusted to be different from the repetition frequency of the sweep voltage of the cathode-ray oscilloscope. It is noted that with this arrangement no connection is required to the sweep voltage generator within the oscilloscope. Some simplification is afforded as most cathode-ray oscilloscopes are not provided with terminals to the sweep voltage generator.

In Fig. 4 terminals 22 are coupled to the input terminals of the vertical deflection amplifier of oscilloscope 2. The waveform of the voltage coupled to terminals 22 is displayed on the face of the cathode-ray tube. The input terminals of synchronized variable delay pulse generator 17 are coupled to the terminals 22. The output terminals of generator 19 are coupled to the switching circuit 9. The input terminals of the switching circuit are coupled directly to terminals 22. Voltmeter 10 is coupled to the output terminals of switching circuit 9. Resistor 23 is connected in parallel with the output condenser of switching circuit 9.

The operation of the synchronized variable delay pulse generator 17 is the same as previously described. The output pulses energize the switching circuit 9 to sample the voltage across the input terminals at the occurrence of the pulses. Without an isolating stage between switching circuit 9 and terminals 22 a small drop in the magnitude of the voltage wave will occur at the instants the switching circuit is energized. This is due to the instantaneous connection of the output condenser of the switching circuit across terminals 22. As this condenser gradually discharges through resistor 23 between energizing pulses, the instantaneous intensity of the voltage wave to be measured is slightly greater than the voltage remaining across the condenser at times just prior to the energizing pulses. Thus, the load of the condenser across any applied voltage source at the instants of the energizing pulses causes a small instantaneous drop in the applied voltage wave. This small drop can be seen on the displayed waveform at the point c and serves the useful purpose of marking the selected point. D. C. voltmeter 10 indicates the magnitude of the direct voltage across the condenser.

This version of the invention is greatly simplified over the above arrangements. While it is not as accurate as the previous devices, it is convenient for making production measurements where a number of identical equipments are to be adjusted. Z-axis terminals to the oscilloscope are not required with this embodiment. The measuring device is easy to set up and simple to operate.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A voltage measuring device for measuring the instantaneous intensity of an alternating voltage comprising a pair of terminals for receiving the alternating voltage, an oscilloscope coupled to said terminals for displaying the waveform of the alternating voltage, a variable delay pulse generator synchronized to the alternating voltage across said terminals, a switching circuit coupled to said terminals, means including said pulse generator for simultaneously marking a selected point on the displayed waveform and for energizing said switching circuit, and a voltage indicating device coupled to said switching circuit.

2. A voltage measuring device for measuring the instantaneous magnitude of an alternating voltage comprising a pair of terminals for receiving the alternating voltage, a cathode-ray tube indicator coupled to said terminals for displaying the waveform of the alternating voltage, a variable delay pulse generator coupled to said terminals and synchronized to the alternating voltage, a connection from said pulse generator to said cathode-ray tube to mark a selected point on the displayed waveform, a switching circuit coupled to said terminals, a connection from said pulse generator to said switching circuit for simultaneously energizing said switching circuit and marking the selected point on the displayed waveform, and a voltage indicating device coupled to said switching circuit.

3. A voltage measuring device for measuring the instantaneous magnitude of an alternating voltage comprising input circuit means for receiving the alternating voltage comprising input circuit means for receiving the alternating voltage, an oscilloscope coupled to said input circuit means for displaying the waveform of the alternating voltage, a variable delay pulse generator coupled to said input circuit means and synchronized to the alternating voltage, a connection from said pulse generator to said oscilloscope to intensify a point on the displayed waveform, said variable delay pulse generator including a variable time delay means for selecting the point on the displayed waveform to be intensified, a switching circuit coupled to said input circuit means, a connection from said pulse generator to said switching circuit for simultaneously energizing said switching circuit and intensifying the selected point on the displayed waveform, and a voltage indicating device coupled to said switching circuit.

4. Electrical measuring apparatus comprising an input circuit for receiving a voltage wave to be analyzed, a wave display device coupled to said input circuit for displaying a representation of a voltage wave received by said input circuit, a voltage measuring device and means for periodically coupling said input circuit to said voltage measuring device during selected very short equal instants of time separated by appreciably longer equal time intervals and for blocking energy transfer therebetween during said longer intervals, said last named means including means for producing a distinctive mark throughout said selected instants.

5. Electrical measuring apparatus as defined in claim 4, wherein said wave display device comprises a cathode-ray oscilloscope having a sweep circuit and said means for periodically coupling said input circuit to said voltage measuring device includes means responsive to said sweep circuit for synchronizing said displayed wave representation and said instants of coupling.

6. Electrical measuring apparatus as defined in claim 4, wherein said means for periodically coupling said input circuit to said voltage measuring device comprises means coupled to said input circuit for synchronizing said displayed wave representation and said instants of coupling.

7. Electrical measuring apparatus as defined in claim 4, wherein said wave display device comprises a cathode-ray oscilloscope and said means for producing a distinctive mark comprises means for momentarily changing cathode ray beam intensity.

8. Electrical measuring apparatus as defined in claim 4, wherein said wave display device is a cathode-ray oscilloscope, and said means for producing a distinctive mark comprises means for momentarily producing a deflection transverse the sweep deflection.

9. The method of producing a direct voltage proportional to the instantaneous intensity of an alternating voltage wave, consisting in the steps of displaying the waveform of the alternating voltage on an oscilloscope, selecting a point on the displayed waveform, marking said selected point, sampling the alternating voltage only during the instants that the selected point on the displayed waveform is marked, and charging a condenser to the value of the sampled voltage.

10. In a system for measuring the instantaneous value of an alternating voltage including a display device for displaying the waveform of the voltage and a voltage indicating device: the combination comprising a switching circuit, means for applying the alternating voltage to said switching circuit, a variable delay pulse generator, means for applying the alternating voltage to said pulse generator to produce a train of delayed pulses at a repetition frequency equal to the frequency of said alternating voltage, said variable delay pulse generator including a variable time delay means for selecting the delay time of the train of pulses, means for applying said delayed pulses to said switching circuit to energize it with each of said pulses, means adapted to apply the output of said switching circuit to said voltage indicating device, and means adapted to apply said pulses to said display device for marking a selected point on the displayed waveform.

11. A device for producing a direct voltage equal to the instantaneous intensity of a periodic voltage wave at periodically selected times comprising an input circuit for receiving the periodic voltage, an oscilloscope coupled to said input circuit for displaying the waveform of the voltage, a synchronized variable delay pulse generator coupled to said input circuit for producing a series of pulses occurring at the periodically selected times, switching means coupled to said input circuit, a condenser coupled to said switching means, and coupling means from said pulse generator to said switching means for energizing said switching means and for simultaneously marking the displayed waveform at the periodically selected times.

12. Electrical measuring apparatus comprising an input circuit for receiving a voltage wave whose instantaneous intensity is to be measured, switching circuit means coupled to said input circuit, voltage indicating means coupled to said switching circuit, a voltage waveform displaying device coupled to said input circuit and impulse means coupled to said switching circuit and to said displaying device for momentarily energizing said switching circuit and marking the displayed waveform.

13. Instantaneous voltage measuring apparatus comprising an input circuit, a switching circuit coupled to said input circuit, a voltage indicator coupled to said switching circuit, a voltage waveform displaying device coupled to said input circuit, and actuating means coupled to said switching circuit for momentarily closing said switching circuit and marking the displayed waveform on said waveform displaying device.

14. An instrument for measuring the magnitude of a periodic voltage at periodically repeating instants of time comprising a switching circuit for receiving the periodic voltage, an oscilloscope coupled to said switching circuit for displaying the waveform of the periodic voltage, an indicating device coupled to said switching circuit, and an energizing means coupled to said switching circuit and said oscilloscope for energizing said switching circuit and for simultaneously marking the diplayed waveform at the periodically repeating instants of time.

15. A device for measuring the coordinates of a periodic voltage wave at periodically selected times comprising a pair of terminals for receiving the voltage wave, an oscilloscope coupled to said terminals for displaying the magnitude versus time characteristic of the voltage wave, a pulse generator coupled to said terminals for producing a periodic series of pulses occurring at the selected times and delayed from the periodic voltage wave, switching means coupled to said terminals, a voltage magnitude indicating device coupled to said switching means, connecting means from said pulse generator to said switching means for momentarily energizing said switching means and marking the displayed waveform at the periodically selected times, and time measuring apparatus coupled to said pulse generator for measuring the time delay between the periodic series of pulses and the periodic voltage wave.

BENJAMIN F. SPENCER.

REFERENCES CITED

The following references are of record in the file of this patent:

UNITED STATES PATENTS

| Number | Name | Date |
| --- | --- | --- |
| 2,370,692 | Shepherd | Mar. 6, 1945 |
| 2,402,916 | Schroeder | June 25, 1946 |
| 2,412,111 | Wilson | Dec. 3, 1946 |
| 2,419,576 | Levy | Apr. 29, 1947 |
| 2,490,530 | Loughlin | Dec. 6, 1949 |